US006958975B1

(12) United States Patent
Kawataka

(10) Patent No.: US 6,958,975 B1
(45) Date of Patent: Oct. 25, 2005

(54) CONGESTION INFORMATION SETTING SYSTEM

(75) Inventor: Miyuki Kawataka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/401,934

(22) Filed: Sep. 23, 1999

(30) Foreign Application Priority Data

Oct. 5, 1998 (JP) ................................ 10-282567

(51) Int. Cl.[7] .......................... H04J 3/14; H04L 12/28; H04L 12/56

(52) U.S. Cl. .................. 370/236; 370/230.1; 370/466; 370/401

(58) Field of Search ............................ 370/229, 230.1, 370/235–236.1, 465–467, 469, 401, 410, 370/231, 395.6, 396.63

(56) References Cited

U.S. PATENT DOCUMENTS 5,315,588 A 5/1994 Kajiwara et al.
5,497,375 A * 3/1996 Hluchyj et al. ............. 370/232
5,610,918 A 3/1997 Kamo et al.
5,699,345 A 12/1997 Watanuki et al.
5,936,958 A * 8/1999 Soumiya et al. ....... 370/395.43
5,960,215 A * 9/1999 Thomas et al. ............... 710/52
6,118,759 A * 9/2000 Ohyoshi et al. ............ 370/229
6,205,152 B1 * 3/2001 Von Ahnen et al. .... 370/395.63
6,473,430 B2 * 10/2002 Sreedharan et al. ... 370/395.63

FOREIGN PATENT DOCUMENTS

JP 07-202903 8/1995
JP 7-202903 8/1995
JP 9-214544 8/1997
JP 10-135964 5/1998

OTHER PUBLICATIONS

Naotaka Morita, et al. Study on ATM Adaptation Layer (AAL) for Frame Relay Interworking. NTT Communication Switching Labs. Technical Report of the Institute of Electronics, Information and Communication Engineers, Mar. 18, 1993, vol. 92, No. 513, p. 31-36.
Notice of Reasons for Rejection dated Aug. 31, 2004.

* cited by examiner

*Primary Examiner*—Chi Pham
*Assistant Examiner*—Ronald Abelson
(74) *Attorney, Agent, or Firm*—Katten Muchin Rosenman LLP

(57) ABSTRACT

In a transmission service for connecting a frame relay network to an ATM (asynchronous transfer mode) network, a congestion information setting system used in a connection apparatus capable of interfacing between the frame relay network and the ATM network, is arranged by: a congestion information extracting unit extracting congestion information from data of one network of either the frame relay network and the ATM network; a mode setting unit combining the extracted congestion information with congestion information of an output side in accordance with a setting condition; and a congestion information writing unit writing the combined congestion information into data of the other network of either the frame relay network and the ATM network in response to a mode set by the mode setting unit. Thus the congestion information can be transmitted between different networks.

6 Claims, 21 Drawing Sheets

● BLOCK DIAGRAM OF ATM TO FR / FR TO ATM (FORWARD, BACKWARD)

FIG. 8

| FIELD | OCTET | CONTENT |
|---|---|---|
| USER DATA | 1~655350 | USER DATA FIELD:<br>IN THE CASE OF LENGTH FIELD VALUE ≥ 1,<br>CPAAL5-5DU IS TRANSMITTED.<br>IN THE CASE OF LENGTH FIELD VALUE = 0,<br>FORWARD ABORT FORMATION FOR CAAL5-PDU<br>IS APPLIED. |
| PAD | 0~47 | PAD FIELD: |
| UU | 1 | USER-USER FIELD: |
| CPI | 1 | COMMON PART INDICATOR FIELD: |
| LENGTH | 2 | LENGTH FIELD: |
| CRC-32 | 1 | CRC-32 FIELD: |

FIG. 9

| | | | |
|---|---|---|---|
| 1 | CFC(UNI)/VPI(NNI) | VPI | |
| 2 | VPI | VCI | |
| 3 | VCI | | |
| 4 | VCI | PTI | CLP |
| 5 | HEC | | |
| ... 53 | Pay load | | |

FIG. 18

| | CONTENTS | REMARKS |
|---|---|---|
| MODE 1 | FECN of Q. 922-DLL frame is not mapped to EFCI of the ATM cell belonging to that frame. That is, EFCI field of ATM cell is constantly set to "no congestion occurs."<br>However, if no congestion occurs in a forward direction, FECN field of FRSSCS-PDU is constantly set to "no congestion occurs."<br>Or otherwise, FECN field of FRSSCS-PDU is set to "congestion occurs." That is, EFCI field of Q. 922-DLL frame is copied to FECN field of FR-SSCS-PDU without any modification. | |
| MODE 2 (NEW) | FECN of Q. 922-DLL frame is mapped to EFCI of all ATM cells belonging to that frame. | |
| MODE 3 (NEW) | FECN of Q. 922-DLL frame is not mapped to EFCI of the last ATM cell belonging to that frame. | |

FIG. 19

| | RECEPTION | TRANSMISSION | | REMARAKS |
|---|---|---|---|---|
| | Q.922 FECN | FR-SSCS FECN | ATM EFCI | |
| MODE 1 | 0<br>1 | 0<br>1 | 0<br>0 | |
| MODE 2 (NEW) | 0<br>1 | 0<br>1 | 0<br>1 ※1 | ※1 : SET TO ALL ATM CELLS |
| MODE 3 (NEW) | 0<br>1 | 0<br>1 | 0<br>1 ※2 | ※2 : SET TO FINAL ATM CELL |

FIG. 20

| | CONTENT | REMARKS |
|---|---|---|
| MODE 1 | If EFCI field is set to "congestion occurs" at the last ATM cell of the segment frame to be received, or if FECN field of FR-SSCS-PDU to be received is set to "congestion occurs," FECN of Q. 922-DLL frame is set to "congestion occurs." | |
| MODE 2 | If EFCI field is set to "congestion occurs" at any of the ATM cell of segment frame to be received, or if FECN field of FR-SSCS-PDU to be received is set to "congestion occurs," FECN of Q. 922-DLL frame is set to "congestion occurs." | |

FIG. 21

| | ATM EFCI | FR-SSCS FECN | Q.922 FECN | REMARKS |
|---|---|---|---|---|
| MODE 1 | 0<br>0<br>1 *1<br>1 *1 | 0<br>1<br>0<br>1 | 0<br>1<br>1<br>1 | *1: If EFCi has been set at last final ATM cell |
| MODE 2 (NEW) | 0<br>0<br>1 *2<br>1 *2 | 0<br>1<br>0<br>1 | 0<br>1<br>1<br>1 | *2: If EFCi has been set at any of the ATM cell |

FIG. 22

| | CONTENT | REMARKS |
|---|---|---|
| MODE 1 | BECON FIELD OF FIR-SSCS-PDU IS DUPLICATED TO BECN FIELD OF Q.922 CORE FRAME WITHOUT ANY CHANGE. | |
| MODE 2 (NEW) | BECN OF Q.922-DLL FRAME IS ALWAYS SET TO "0". | |

FIG. 23

| | RECEPTION | TRANSMISSION | REMARKS |
|---|---|---|---|
| | FR-SSCS BECN | Q.922 BECN | |
| MODE 1 | 1<br>0 | 1<br>0 | |
| MODE 2 (NEW) | 1<br>0 | 0<br>0 | |

FIG. 24

| | CONTENT | REMARKS |
|---|---|---|
| MODE 1 | 1. If BECN of Q. 922-DLL frame to be delivered from FR to ATM directions has been set, or<br>2. if the value of EFCI in the last segment frame ATM cell to be received from ATM to FR directions used in the bi-directional connection is used for a VCC congestion state transition and the VCC congestion state is of "congestion occurs,"<br>FR-SSCS BECN = 1 is set. | |
| MODE 2 (NEW) | 1. If BECN of Q. 922-DLL frame to be delivered from FR to ATM directions has been set, or<br>2. if the value of EFCI in any of the segment frame ATM cell to be received from ATM to FR directions used in the bi-directional connection is used for a VCC congestion state transition and the VCC congestion state is of "congestion occurs,"<br>FR-SSCS BECN = 1 is set. | |
| MODE 3 (NEW) | 1. BECN of Q. 922-DLL frame to be received is ignored.<br>Therefore,<br>2. Only if the condition is similar to that of MODE 1 (2), FR-SSCS BECN = 1 is set. | |
| MODE 4 (NEW) | 1. BECN of Q. 922-DLL frame to be received is ignored.<br>Therefore,<br>2. Only if the condition is similar to that of MODE 2 (2), FR-SSCS BECN = 1 is set. | |

FIG. 25

| | VCC CONGESTION STATE | RECEPTION | TRANSMISSION | |
|---|---|---|---|---|
| | | Q.922 BECN | FR-SSCS BECN | |
| MODE 1 | NO CONGESTION OCCURS | 0<br>1 | 0<br>1 | ※1 : WHEN EFCI IS SET TO FINAL ATM CELL |
| | CONGESTION OCCURS | 0<br>1 | 1<br>1 | |
| MODE 2 (NEW) | NO CONGESTION OCCURS | 0<br>1 | 0<br>1 | ※2 : WHEN EFCI IS SET TO ANY ONE OF ATM CELLS |
| | CONGESTION OCCURS | 0<br>1 | 1<br>1 | |
| MODE 3 (NEW) | NO CONGESTION OCCURS | 0<br>1 | 0<br>0 | ※1 : WHEN EFCI IS SET TO FINAL ATM CELL |
| | CONGESTION OCCURS | 0<br>1 | 1<br>1 | |
| MODE 4 (NEW) | NO CONGESTION OCCURS | 0<br>1 | 0<br>0 | ※2 : WHEN EFCI IS SET TO ANY ONE OF ATM CELLS |
| | CONGESTION OCCURS | 0<br>1 | 1<br>1 | |

CONGESTION INFORMATION SETTING SYSTEM

BACKGROUND OF THE INVENTION

1. Field of the Invention

The present invention generally relates to a congestion information setting system used in a local area network (LAN). More specifically, the present invention is directed to such a technique capable of transferring congestion information in a transmission service for connecting a frame relay network to an ATM network.

2. Description of the Related Art

A transmission service capable of realizing an interworking function by connecting an FRS (Frame Relay Service) network to an ATM (Asynchronous Transfer Mode) network is known in the technical field.

FIG. 2 schematically indicates a structure of a system capable of realizing this interworking function service. In this figure, reference numeral 201 shows an ATM network, reference numeral 202 indicates an FRS/ATM converting function unit, reference numeral 203 denotes a node, and reference numeral 204 represents a frame relay terminal connected to this node 203. In this system, both the node 203 and the frame relay terminal 204 constitute a frame relay network 205.

In such a system arrangement, a frame relay format is converted into an ATM cell format, and also an ATM cell format is converted into a frame relay format in the FRS/ATM converting function unit 202. That is to say, a format conversion in a direction from a frame relay format to an ATM cell format is indicated in FIG. 3. Referring now to FIG. 3, a description will be made of a format converting sequence in the direction from the frame relay format to the ATM cell format.

First, in an FR-SSCS (Frame Relaying—Service Specific Convergence Sublayer) layer, both an address field of Q. 922-DLL-PDU (Dynamic Link Library—Protocol Data Unit) and an information field thereof, from which "0" bit has been deleted, are derived so as to be converted into an FR-SSCS-PDU (Frame Relaying—Service Specific Convergence Sublayer—Protocol Data Unit).

In a CPAAL5 (Common Part ATM Adaptation Layer 5), the converted FR-SSCS-PDU is acquired as a CPAAL5-SDU (Service Data Unit). A CPAAL5-PDU (Protocol Data Unit) trailer portion is added to this acquired CPAAL5-SDU, and then the resulting PDU is converted into a CPAAL5-PDU.

Furthermore, this CPAAL5-PDU is divided every 48 octets into SAR-PDU.

In an ATM layer, an ATM header containing a PTI and the like is added to this divided SAR-PDU (Segment And Reassembly—Protocol Data Unit), and then the resulting PDU is converted into an ATM cell which is transmitted to an ATM-UNI (Asynchronous Transfer Mode—User—Network Interface).

On the other hand, a format converting sequence along a direction from an ATM cell format to a frame relay format is carried out opposite to the above-explained format converting sequence.

In the transmission service for providing such an interworking function, a congestion control was carried out as follows:

First, in the case of a forward direction from a frame relay format to an ATM cell format, an FECN (Forward Explicit Congestion Notification) indicative of congestion information of Q. 922-DLL is not mapped to an EFCI (Explicit Forward Congestion Indication) representative of congestion information, which is stored into a PTI (Payload Type Identifier) field of an ATM cell belonging to this frame. In other words, the EFCI of the ATM cell would be always set to "no congestion".

Next, in the case of a forward direction from an ATM cell format to a frame relay format, only a portion of congestion information in an ATM network could be utilized for a frame relay. In other words, only when an EFCI field is set as "congestion occurs" in a last received ATM cell, this congestion information may be reflected to the frame relay.

On the other hand, in the case of a backward direction from an ATM cell format to a frame relay format, a BCI (Backward Congestion Indication) is provided only at a frame level having a BECN (Backward Explicit Congestion Notification). In this case, a BECN field of an FR-SSCS-PDU is duplicated without any change to a BECN field of a Q. 922 core frame.

Also, in the case of a backward direction from a frame relay format to an ATM cell, when a BECN of a Q. 922-DLL frame transmitted along the direction from the frame relay format to the ATM cell is set as "congestion occurs", or when an EFCI of an ATM cell contained in a segment frame last received along the direction from the ATM cell format to the frame relay format is set as "congestion occurs", a BECN field of an FR-SSCS-PDU is set as "congestion occurs".

However, in this backward direction, the congestion information contained in the Q. 922 core frame and the congestion information contained in the FR-SSCS are not always identical to each other as to the protocol field and the function in the ATM network. As a consequence, in such a case that different types of networks are connected to each other, distortion may occur in the congestion information. As a result, although such congestion information may not be required for a certain service form, there are possibilities that extra workloads are given to an information control unit of a network so as to process this congestion information.

The present invention has been made to solve the above-explained problems, and therefore, has an object to provide a congestion information setting system capable of transmitting congestion information even in an interworking function effected between a frame relay network and an ATM network.

SUMMARY OF THE INVENTION

To achieve the above-described object, a first means of the present invention is featured by that in a connection apparatus for interfacing a frame relay network and an ATM network, the first means is provided with: congestion information extracting means for extracting congestion information from data of one network of the frame relay network and the ATM network; mode setting means for combining the extracted congestion information with congestion information of an output side in accordance with a setting condition; and congestion information writing means for writing the combined congestion information into data of the other network of the frame relay network and the ATM network in response to a mode set by the mode setting means.

Since the mode setting means is employed, the congestion information can be transmitted between different networks in a flexible manner. That is, this first means enables to be flexibly applied to a case that congestion information of one network is directly transmitted to the other network, another case that the congestion information of one network is directly transmitted to the other network only under predetermined condition, and another case that the congestion information of one network is completely untransmitted to the other network.

A second means of the present invention is featured by that in the above-described first means, while setting the congestion information along a forward direction defined from the frame relay network to the ATM network, when the mode setting means receives frame relay data indicating that the congestion information corresponds to "congestion occurs", the mode setting means selects any one of: a first mode in which "congestion occurs" is set to at least congestion information of an ATM cell corresponding to a segment frame; a second mode in which "congestion occurs" is set to congestion information of all of ATM cells corresponding to a segment frame; and a third mode in which "congestion occurs" is set only to congestion information of a final ATM cell corresponding to a segment frame. As a result, the congestion information can be transmitted along the forward direction defined from the frame relay network to the ATM network.

A third means of the present invention is featured by that in the above-explained first means, while setting the congestion information along a forward direction defined from the ATM network to the frame relay network, when the mode setting means receives an ATM cell indicating that the congestion information corresponds to "congestion occurs", the mode setting means selects any one of: a first mode in which "congestion occurs" is set to at least congestion information of frame relay data when said received ATM cell is a final ATM cell corresponding to a segment frame; and a second mode in which "congestion occurs" is set to congestion information of frame relay data when the received ATM cell is any one of ATM cells corresponding to a segment frame.

As a consequence, since only the congestion information of the final ATM cell is employed (first mode), the congestion information of the other ATM cells can be neglected, so that the congestion information can be effectively processed.

Furthermore, while another system (second mode) for transmitting the congestion information by any of the ATM cells is provided, an ATM cell having high reliability of information to be transmitted can be processed with a priority.

A fourth means of the present invention is featured by that in the above-described first means, while setting the congestion information along a backward direction defined from the ATM network to the frame relay network, the mode setting means selects any one of: a first mode in which the congestion information transmitted from the backward direction is directly set to congestion information of frame relay data; and a second mode in which congestion information of frame relay data is always set to "no congestion". As previously explained, since the second mode is provided, in such a case that distortion occurs when the different types of networks are connected to each other, the congestion information is discarded, so that the processing operation can be carried out irrespective of the congestion information.

A fifth means of the present invention is featured by that in the above-explained first means, while setting the congestion information along a backward direction defined from the frame relay network to the ATM network, the mode setting means is comprised of congestion transition means for transferring a congestion state in response to a congestion information value of an ATM cell received along the backward direction, and the mode setting means selects any one of plural modes prepared by combining the state of the congestion transition means with congestion information of frame relay data.

As a consequence, it is possible to set to the congestion information of the frame relay having no compatibility with respect to the received congestion information.

A sixth means of the present invention is featured by that in the above-explained fifth means, the congestion transition means is comprised of a timer, and forcibly updates a congestion state when new congestion information is not reached for a predetermined time period.

As a result, the congestion information is updated every time a preselected time period has passed, and therefore, it is possible to avoid that the mode is set while maintaining the old congestion information.

BRIEF DESCRIPTION OF THE DRAWINGS

For a better understanding of the present invention, reference is made of a detailed description to be read in conjunction with the accompanying drawings, in which:

FIG. 8 is an explanatory diagram for explaining contents of the respective fields of the CPAAL5-PDU;

FIG. 9 is a format diagram of an ATM cell;

FIG. 18 is an explanatory diagram for explaining types of mode setting of a forward direction defined from a frame relay network to an ATM network;

FIG. 19 is an explanatory diagram for explaining a set value obtained on the basis of a mode setting result of a forward direction defined from a frame relay network to an ATM network;

FIG. 20 is an explanatory diagram for explaining a type of mode setting of a forward direction defined from an ATM network to a frame relay network;

FIG. 21 is an explanatory diagram for explaining a set value obtained on the basis of a mode setting result of a forward direction defined from an ATM network to a frame relay network;

FIG. 22 is an explanatory diagram for explaining types of mode setting for a backward direction defined from an ATM network to a frame relay network;

FIG. 23 is an explanatory diagram for explaining a set value obtained on the basis of a mode setting result of a backward direction defined from an ATM network to a frame relay network;

FIG. 24 is an explanatory diagram for explaining types of mode setting for a backward direction defined from a frame relay network to an ATM network; and FIG. 25 is an explanatory diagram for explaining a set value obtained on the basis of a mode setting result of a backward direction defined from a frame relay network to an ATM network.

DETAILED DESCRIPTION OF THE PREFERRED EMBODIMENTS

Referring now to drawings, various preferred embodiments of the present invention will be described.

Internal Arrangement of FRS/ATM Converting Function Unit

Figure 1:
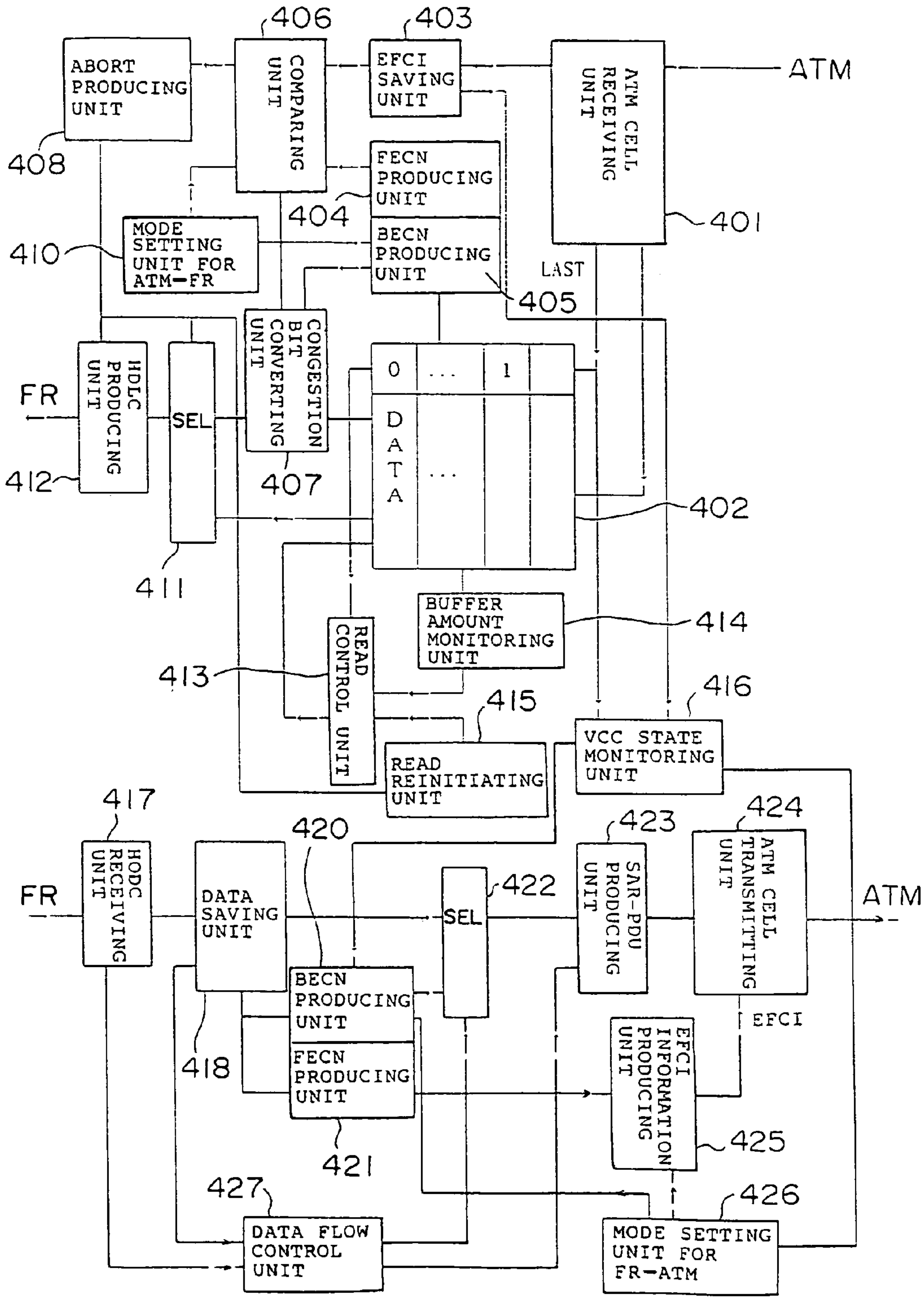
FIG. 1 is a schematic block diagram for showing an arrangement of an FRS/ATM converting function unit according to an embodiment of the present invention.
Figure 2:
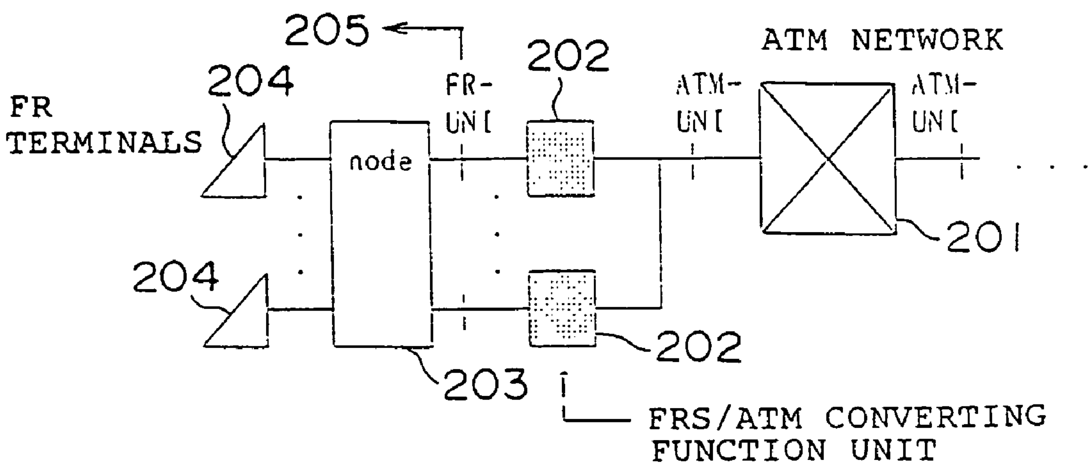
FIG. 2 is a schematic block diagram for representing a system structure capable of realizing an interworking service according to this embodiment of the present invention.

FIG. 1 shows a structural block diagram of an FRS/ATM converting function unit according to an embodiment of the present invention.

In an upper-half drawing portion of this FRS/ATM converting function unit, a data conversion along a direction defined from an ATM cell format to a frame relay format is carried out. In this figure, reference numeral 401 indicates an ATM cell receiving unit, namely corresponding to an interface for receiving an ATM cell sent from an ATM network. Reference numeral 402 shows a data expanding unit. In this data expanding unit 402, data of an ATM cell is expanded, and then, this expanded data is used to constitute frame relay data. Reference numeral 403 represents an EFCI saving unit for extracting an EFCI (Explicit Forward Congestion Indication) from ATM data to save this extracted EFCI. The value of this EFCI is compared with a value of an FECN (Forward Explicit Congestion Notification) produced from the expanded data derived from the data expanding unit 402 by an FECN producing unit (in the case of forward direction) by a comparing unit 406. Then the comparison result is converted into a congestion bit by a congestion bit converting unit 407. The congestion bit is supplied via the congestion bit converting unit 407 to an HDLC producing unit 412. It should be noted that the comparing unit 406 contains a mode setting unit 410. An FECN of a Q. 922-DLL frame is set to either "congestion occurs" or "no congestion" in accordance with a setting mode of this mode setting unit 410.

The function of this mode setting unit 410 will be later discussed more in detail.

An abort producing unit 408 owns a function capable of producing an abort signal in the case that such a recognition is made of "congestion occurs" based on an EFCI extracted from an ATM cell. In response to this abort signal, a transmission frame is deleted in the HDLC producing unit 412.

Also, a BECN producing unit 405 owns a function capable of producing a BECN (Backward Explicit Congestion Notification) along a backward direction. A selector (SEL) has a function capable of selectively sending expanded data derived from the data expanding unit 402 and a conversion result of the congestion bit converting unit 407 to the HDLC producing unit 412.

A buffer amount monitoring unit 414 monitors a buffer state of the data expanding unit 402 to notify the monitored buffer state to a read control unit 413. In response to the notification issued from this buffer amount monitoring unit 414 and a read reinitiating unit 415, the read control unit 413 controls the data reading operation from the data expanding unit 402.

On the other hand, in a lower-half drawing portion of this FRS/ATM converting function unit, a data conversion along a direction defined from a frame relay format to an ATM cell format is carried out.

A HDLC receiving unit 417 receives an HDLC of frame relay data, and transfers this received HDLC to a data saving unit 418. The data saving unit 418 extracts congestion information from this frame relay data, and then sends the extracted congestion information to both a BECN producing unit 420 and the FECN producing unit 421. The BECN produced from the BECN producing unit 420 is supplied to a mode setting unit 426. In accordance with a mode set by this mode setting unit 426, an EFCI is produced from an EFCI information producing unit 425, and this EFCI is inserted into an ATM cell.

Also, a selector (SEL) 422 selectively supplies the outputs derived from the data saving unit 418 and the BECN producing unit 420 to an SAR-PDU producing unit 423. Then, finally, such an ATM cell to which the congestion information has been set in the above manner is transmitted from an ATM cell transmitting unit 424 to an ATM network.

Figure 3:
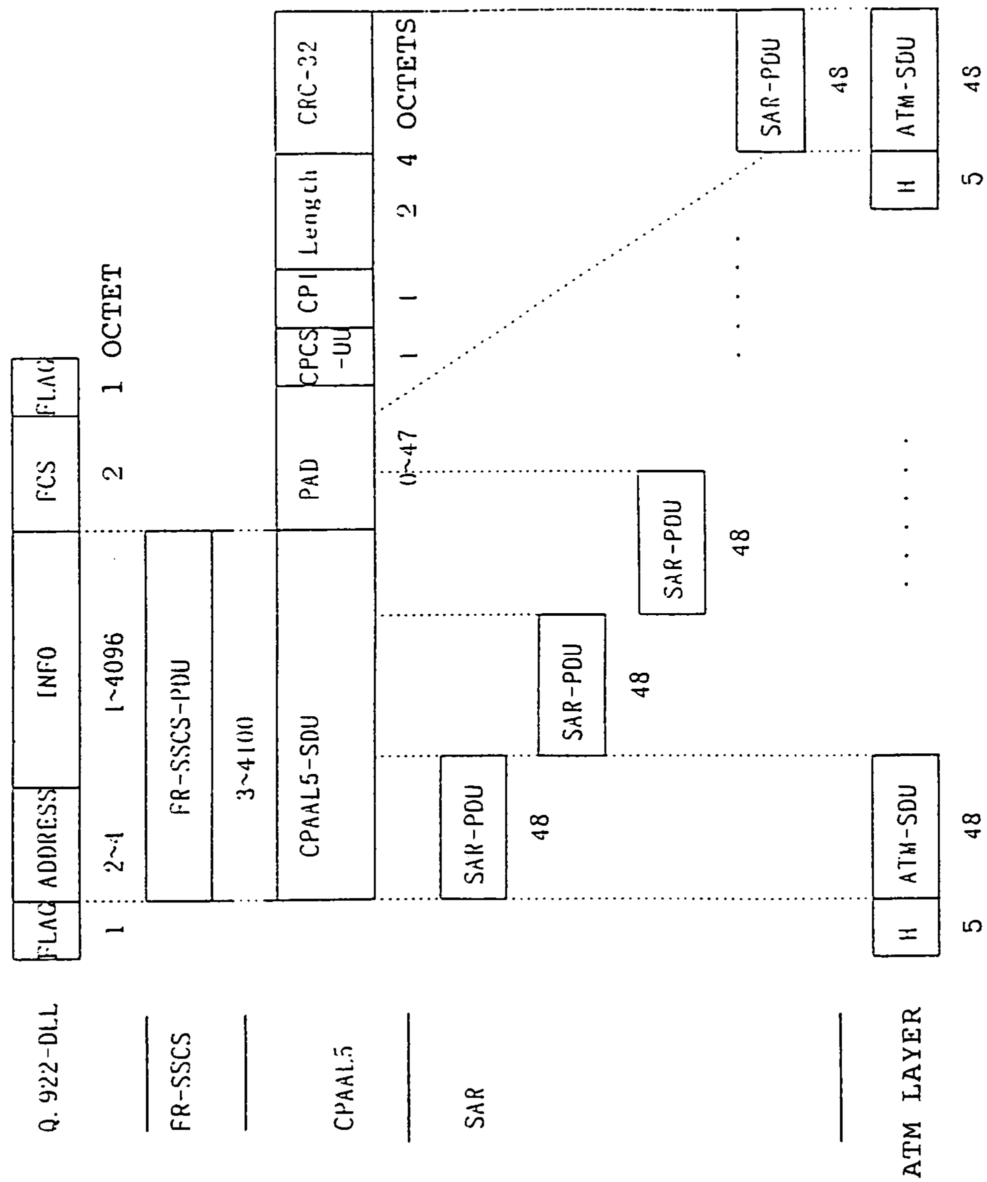
FIG. 3 illustratively shows a format diagram of the respective layers from a frame relay format to an ATM cell format.

Next, frame structures of the respective layers (see FIG. 3) from a frame relay up to an ATM cell employed in this embodiment will now be explained in detail.

Structure of Q. 922-DLL-PDU

Figure 5:
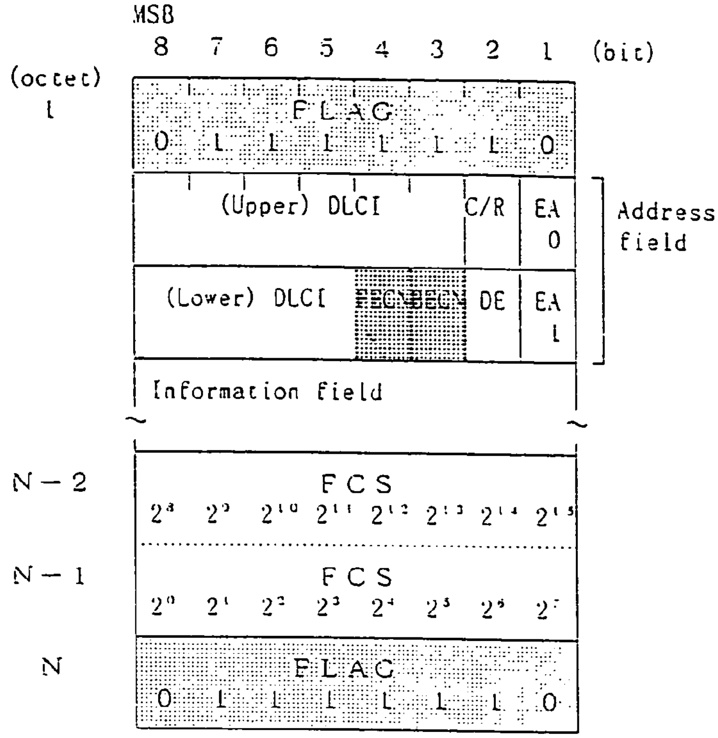
FIG. 5 shows a format diagram of a Q. 922-DLL-PDU.

As indicated in FIG. 5, with respect to a Q. 922-DLL-PDU format, "0" bit is stuffed in fields other than a FLAG field (Bit Stuffing). Accordingly, after a FLAG is detected, "0" located immediately after "1" continued by 5 octets is a extracted to format it as a frame relay. Similar to a header format of an FR-SSCS-PDU format (which will be discussed later), there are 3 types (namely, 2 octets, 3 octets, and 4 octets) of address fields.

The format structure of Q. 922-DLL-PDU shown in FIG. 5 is such a format structure from which "0" bit has been deleted. Also, the address field shown in this drawing is 2 octets.

In this drawing, the congestion information along the forward direction is stored into the FECN (Forward Explicit Congestion Indication), and the congestion information along the backward direction is stored into the BECN (Backward Explicit Congestion Notification).

Structure of FR-SSCS-PDU

Figure 6:
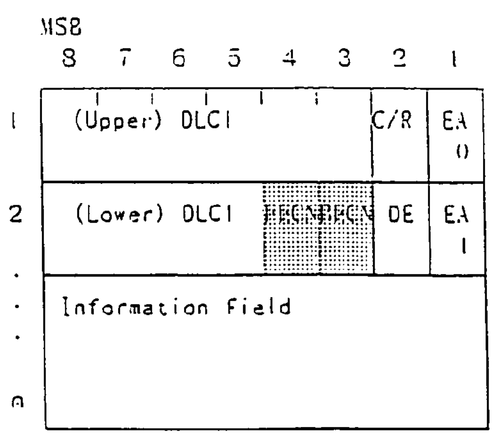
FIG. 6 represents a format diagram of an FR-SSCS-PDU.

As illustrated in FIG. 6, an FR-SSCS-PDU format is identical to the Q. 922-DLL-PDU format except for the flag, the "0"-bit stuffing portion, and the FCS.

Structure of CPAAL5-PDU

Figure 7:
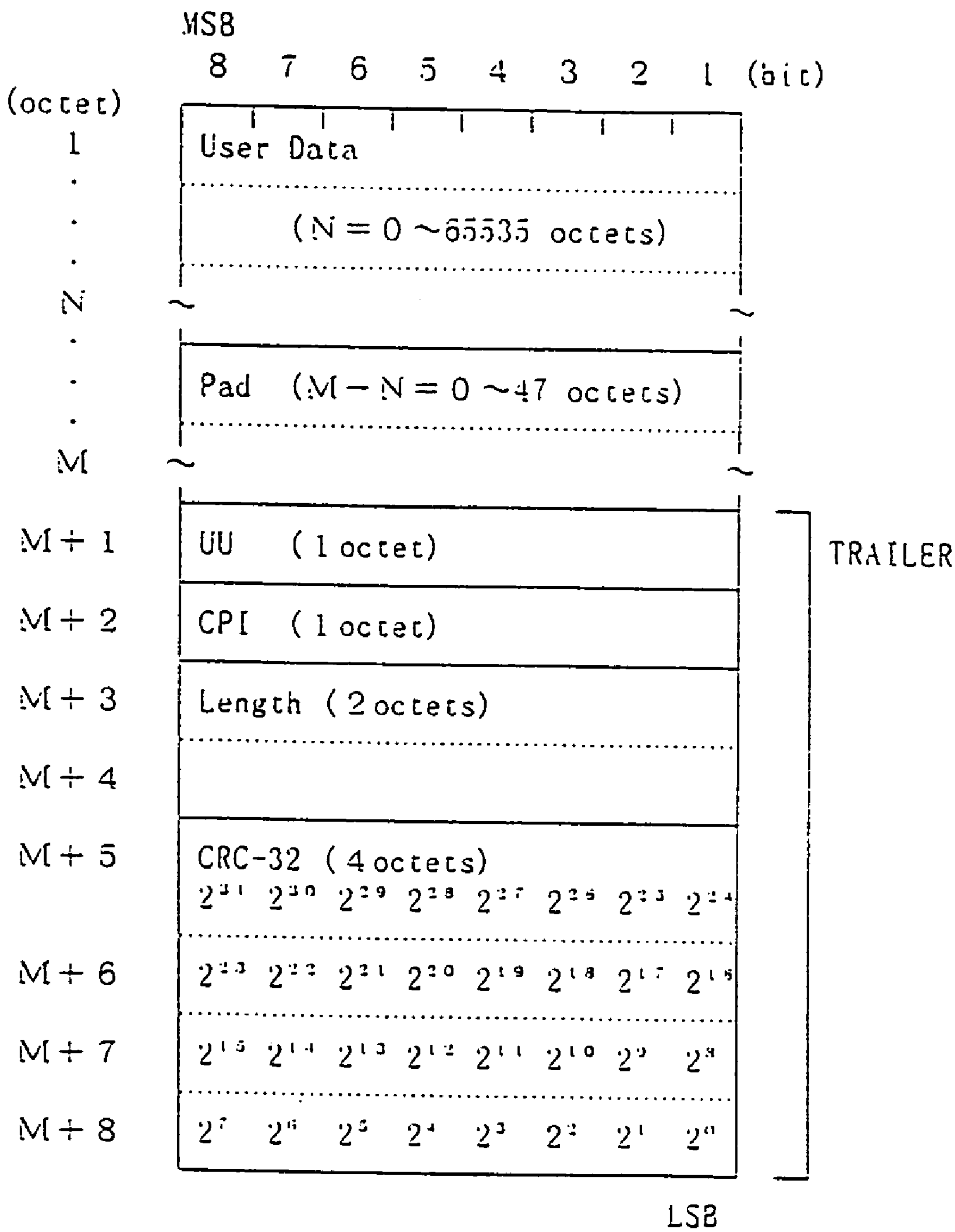
FIG. 7 indicates a format diagram of a CPAAL5-PDU.

FIG. 7 represents a CPAAL5-PDU format. In the CPAAL5, a variable length frame (namely, 1 to 65535-octet lengths) transmission is performed. As a consequence, in the CPAAL5-PDU format, there are provided a pad (PAD: Packet Assembly/Disassembly) used to multiply an ATM cell by an integer, extracting of a frame portion, and a length field for detecting an error which is not detected by CRC-32.

FIG. 8 represents contents of the respective fields contained in the CPAAL5-PDU.

Structure of ATM Cell

FIG. 9 represents a format of an ATM cell. In this drawing, congestion information which is transmitted as EFCI information is stored into a PTI (Payload Type Identifier).

This PTI is arranged by 3 octets. It should be noted that either "000" or "001" implies "no congestion", and either "010" or "011" implies "congestion occurs".

Congestion Information Transmission Along Forward/Backward Directions

Referring now to FIG. 10 to FIG. 13, congestion information along a forward direction and also a backward direction will be described.

In this specification, the following definition is made: with respect to a transmission direction of congestion information, an indication of a congestion condition occurred in an up stream is defined as a "forward direction", whereas an indication of a congestion condition occurred in a down stream is defined as a "backward" direction.

In this case, it is practically difficult to specify an actually existing congestion point with employment of the FECI information, the FECN information, and the BECN information. However, it is possible to clarify a direction along which congestion is present.

Figure 10:
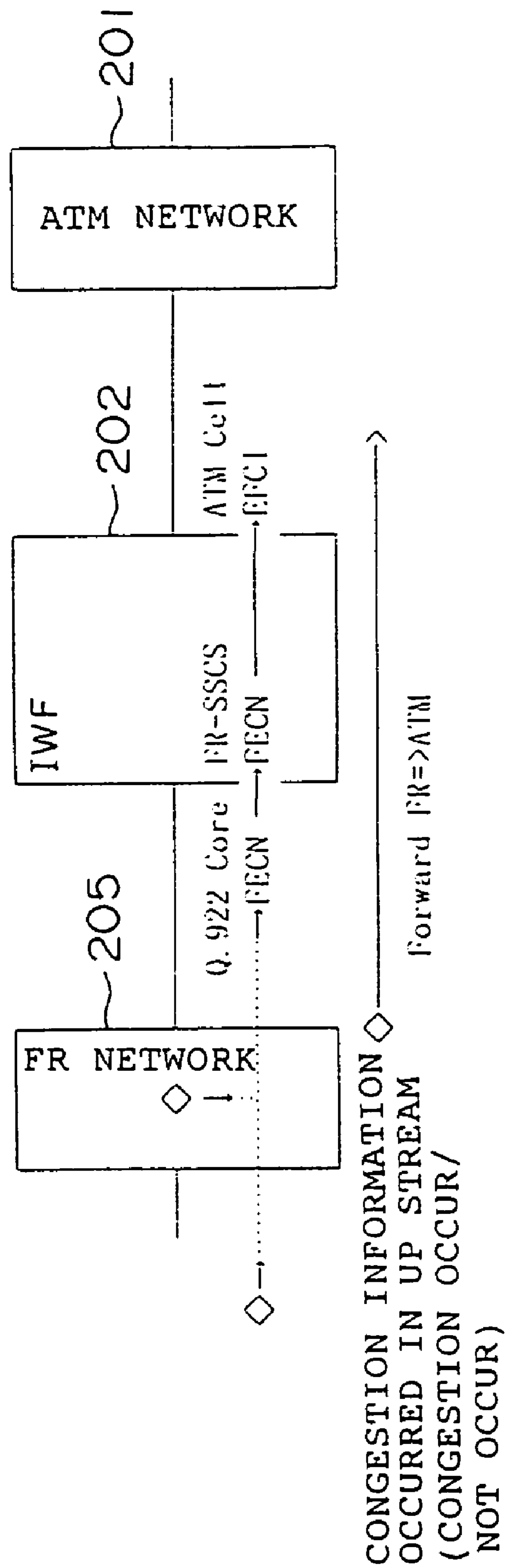
FIG. 10 is an explanatory diagram for explaining a forward direction defined from a frame relay network to an ATM network.

FIG. 10 represents a format direction defined from a frame relay network to an ATM network. A fact as to whether or not congestion is present in the upper stream, namely on the side of a frame relay network 205 is transmitted as an FECN of a Q. 922 core frame. This FECN information of the Q. 922 core frame is converted into an FECN of an FR-SSCS (see FIG. 6) by an FRS/ATM converting function unit (IWF) 202. Then, the converted FECN information of the FR-SSCS is stored into the EFCI which is stored into the PTI of the ATM cell (see FIG. 9), depending upon each of various modes. As a result, it is possible to recognize as to whether or not the congestion is present on the upper stream side (namely on the frame relay network side) in the ATM network 201.

Figure 11:
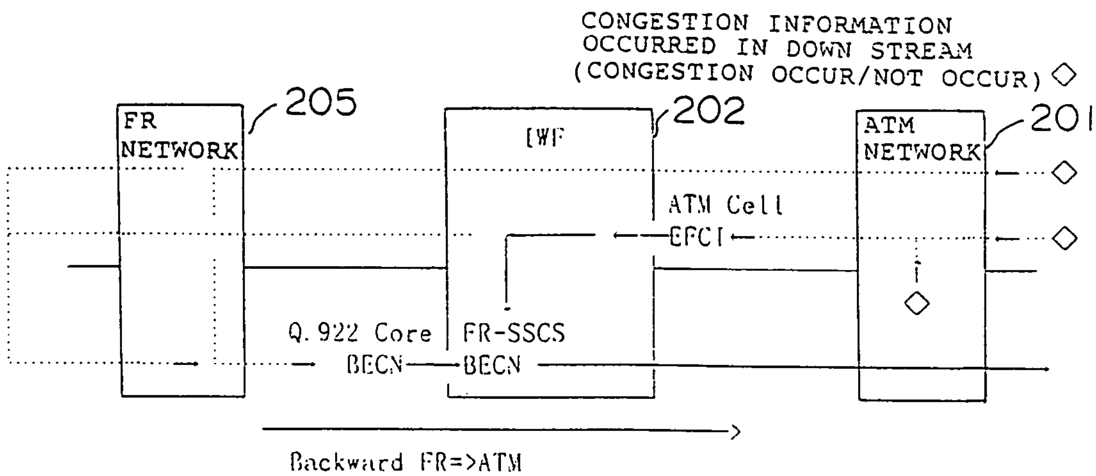
FIG. 11 is an explanatory diagram for explaining a backward direction defined from a frame relay network to an ATM network.

FIG. 11 indicates a backward direction defined from the frame relay network to the ATM network. A Q. 922 BECN indicative of congestion occurred from the upper stream side (frame relay network side) along the backward direction is acquired, and furthermore, an EFCI of an ATM cell arrived from the down stream direction (ATM network side) is read. As a result, these Q. 922 BECN and EFCI of the ATM cell are reflected to BECN of FR-SSCS in accordance with the respective modes, and the congestion information on the down stream side (ATM network side) can be transmitted.

Figure 12:
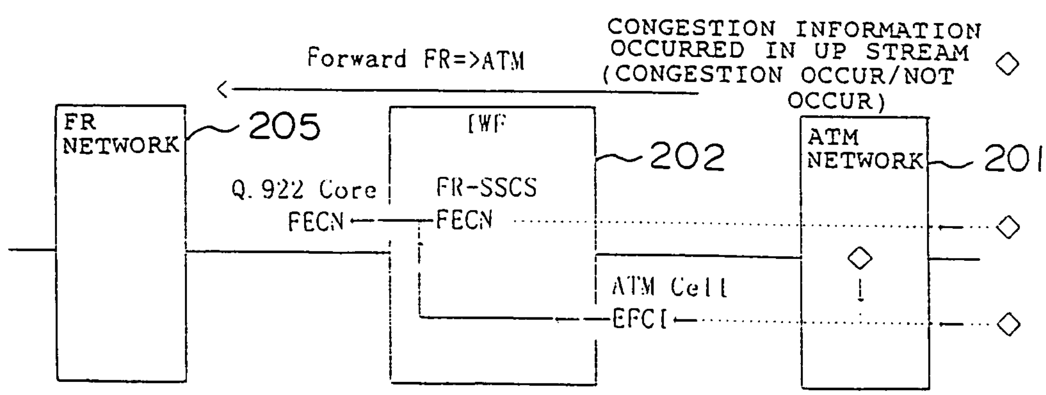
FIG. 12 is an explanatory diagram for explaining a forward direction defined from an ATM network to a frame relay network.

FIG. 12 represents a forward direction defined from the ATM network to a frame relay network. A fact as to whether or not congestion is present in the upper stream, namely on the side of the ATM network 201 is transmitted as an EFCI stored in a PTI of an ATM cell. This EFCI information is converted into an FECN of an FR-SSCS (see FIG. 6) by the FRS/ATM converting function unit (IWF) 202 in combination with the congestion information of the original FECN of the FR-SSCS in accordance with the respective modes. Furthermore, this converted FECN information is transmitted as an FECN of a Q. 922 core frame to the frame relay network 205 side. As a result, it is possible to recognize as to whether or not the congestion is present on the upper stream side (namely on the ATM network side) in the frame relay network 205.

Figure 13:
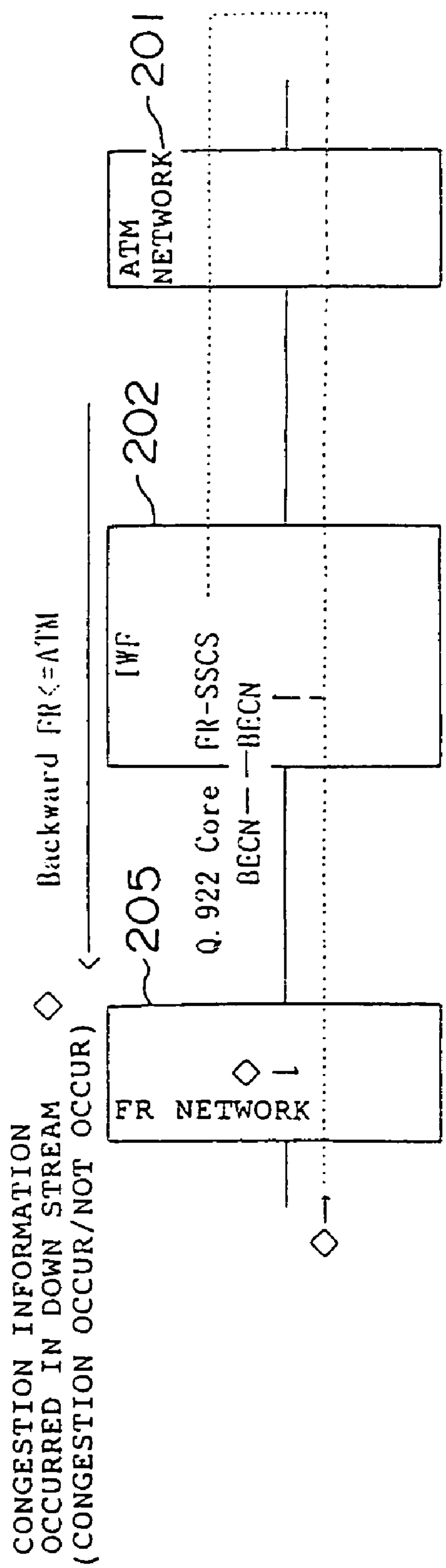
FIG. 13 is an explanatory diagram for explaining a backward direction defined from an ATM network to a frame relay network.

FIG. 13 indicates a backward direction defined from the ATM network to the frame relay network. A BECN of an FR-SSCS arrived from the down stream direction (i.e., frame relay network side) is read into the FRS/ATM converting function unit (IWF) 202, and then this BECN information is converted into a BECN of the Q. 922 core frame in accordance with the respective modes. As a result, the congestion information occurred on the down stream side (frame relay network side) can be transmitted.

In this embodiment, the mode setting units 410 and 426 as explained with reference to FIG. 1 may prepare several modes. In accordance with these modes, a decision is made how congestion information occurred in one network is transferred to another network, depending upon a combination of a group of the above-described frame relay network to ATM network and the above-explained ATM network to frame relay network, and another group of the above-described forward direction and backward direction.

FIG. 14 to FIG. 17 illustratively show types of mode setting operations along the forward/backward directions.

Mode Setting Operation of Forward Direction: Frame Relay Network to ATM Network

Figure 14:
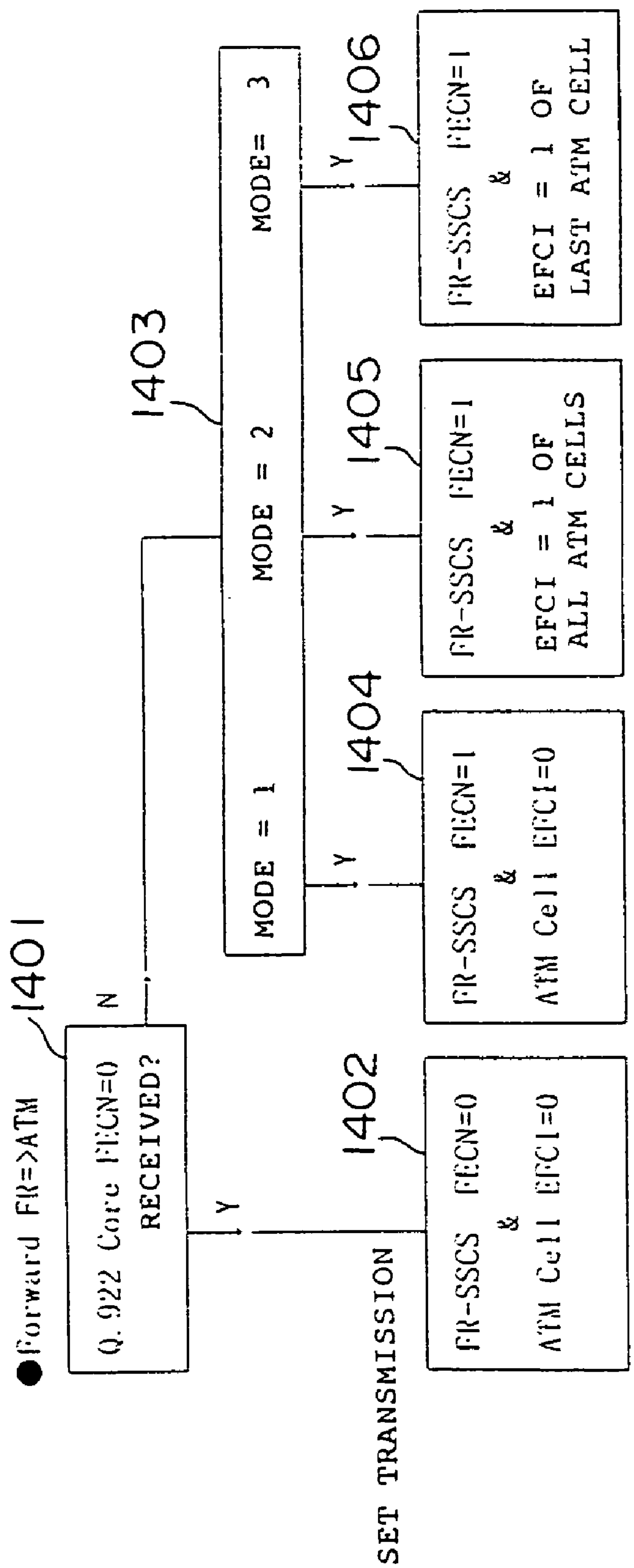
FIG. 14 is a flow chart for describing a mode setting method for a forward direction defined from a frame relay network to an ATM network.

FIG. 14 is a flow chart for showing a control sequence in the forward direction defined from the frame relay network to the ATM network.

In this flow chart, when the FRS/ATM converting function unit (IWF) 202 receives the Q. 922 core frame, if the value of FECN information is equal to "0" (step 1401), namely no congestion occurs on the side of the upper stream (i.e., frame relay network side), then "0" is set to the FECN value of FR-SSCS, and furthermore, "0" is set to the EFCI value of the ATM cell (step 1402).

On the other hand, in such a case that the FECN value of the Q. 922 core frame is not equal to "0" at the above-described step 1401, three modes are selectable.

That is, a first mode (step 1404) corresponds to such a mode similar to the conventional mode. In this first mode, the FECN field of the Q. 922 core frame is directly duplicated to the FECN field of FR-SSCS without any conditions. However, this value is not reflected to the ATM cell. As a consequence, in this first mode, the FECN value of FR-SSCS is set to "1", and the EFCI value of the ATM cell is set to "0".

A second mode (step 1405) corresponds to a mode specific to this preferred embodiment. In this specific second mode, the FECN information of the Q. 922 core frame is mapped to all of the EFCI information of the ATM cells belonging to this core frame (namely, converted from this frame). By using this second mode, the congestion information of the Q. 922 core frame will be directly reflected to all of the ATM cells.

A third mode (step 1406) also corresponds to a mode specific to this preferred embodiment. In this specific third mode, the FECN information of the Q. 922 core frame is mapped only to the EFCI information of the last ATM cell belonging to this core frame (namely, converted from this frame). By using this third mode, the congestion information is merely processed only in the last ATM cell. As a consequence, it is possible to avoid such a problem that the transfer process operation is delayed by executing the cumbersome congestion information processing operation.

FIG. 18 indicates the contents of these first to third modes, and FIG. 19 represents the setting conditions of the FECN of FR-SSCS and the EFCI of the ATM cells in the respective modes.

Mode Setting Operation of Forward Direction: ATM Network to Frame Relay Network

Figure 15:
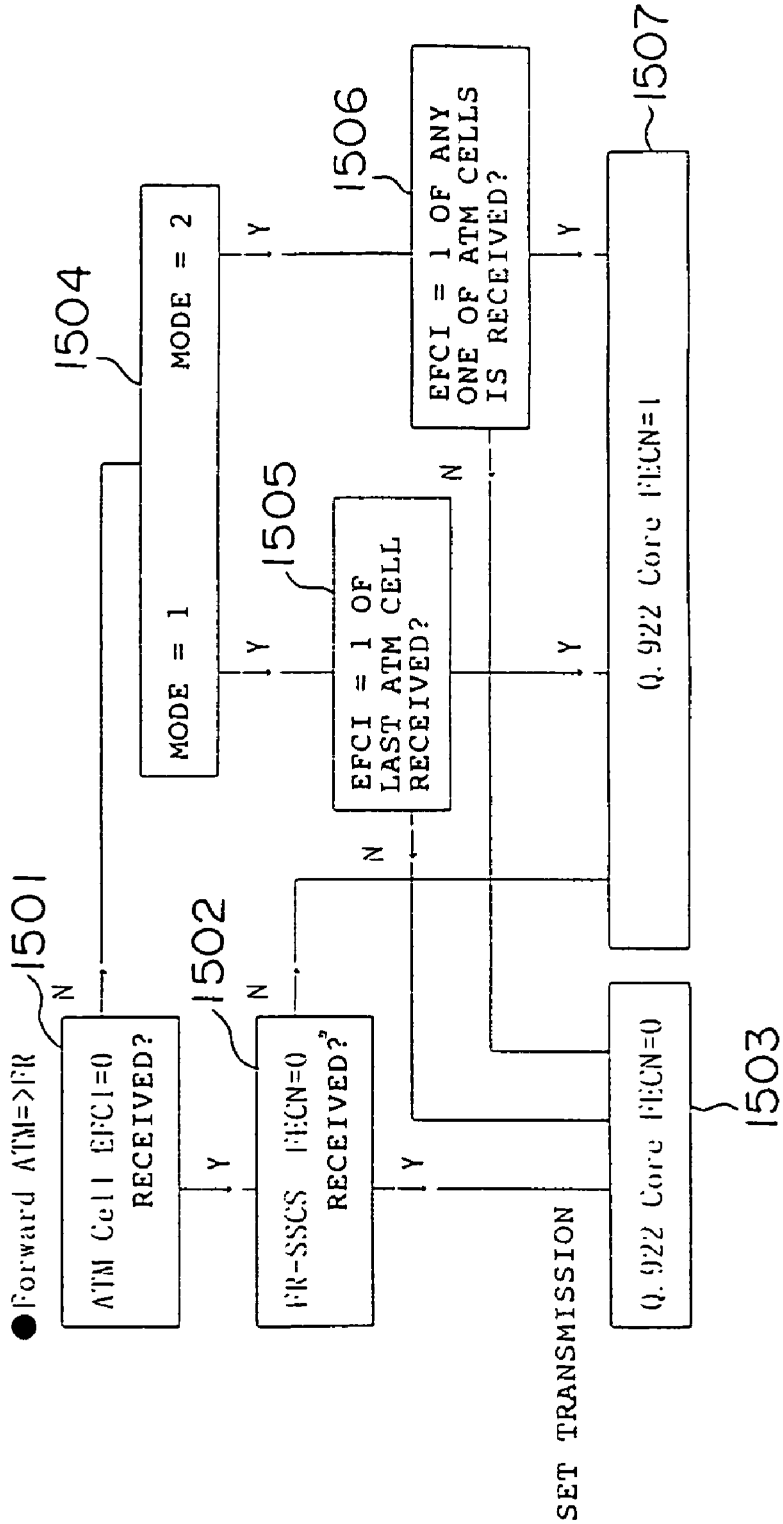
FIG. 15 is a flow chart for describing a mode setting method for a forward direction defined from an ATM network to a frame relay network.

FIG. 15 is a flow chart for showing a control sequence in the forward direction defined from the ATM network to the frame relay network.

In this flow chart, when "0" is set to a value of EFCI of an ATM cell received by the FRS/ATM converting function unit (IWF) 202 (step 1501), a determination is made as to whether or not a value of FECN of FR-SSCS is also equal to "0" (step 1502). When both values are equal to "0", "0" is set to a value of FECN of a Q. 922 core frame (step 1503).

On the other hand, when only a value of FECN of FR-SSCS is equal to "1", "1" is set to a value of FECN of the Q. 922 core frame (step 1507).

Also, when the value of EFCI of the ATM cell is equal to a value other than "0", two modes are selectable (step 1504).

In a first mode (step 1505), a determination is made as to whether or not a value of EFCI of the last ATM cell corresponding to the Q. 922 core frame is equal to "1" (step 1505). When this value is equal to "1", "1" is similarly set to a value of FECN of the Q. 922 core frame (step 1507). In such a case that a value of EFCI of the last ATM cell is not equal to "1", "0" is set to a value of FECN of the Q. 922 core frame (step 1503).

A second mode (step 1506) corresponds to a mode specific to this preferred embodiment. In the case that an EFCI field of any ATM cell belonging to a segment frame to be received is set to "1", "1" is set to the value of FECN of the Q. 922 core frame. Also, when the values of EFCI of any ATM cells are equal to "0", "0" is set to the value of FECN of the Q. 922 core frame (step 1503). In accordance with this second mode, such information for indicating that the congestion occurs in any ATM cell will be reflected to the frame relay network side.

FIG. 20 indicates the contents of the mode operations. FIG. 21 shows the set values of FECN of the Q. 922 core frame in the respective modes.

Mode Setting Operation of Backward Direction: ATM Network to Frame Relay Network FIG. 16 is a flow chart for showing a control sequence in the backward direction defined from the ATM network to the frame relay network.

Figure 16:
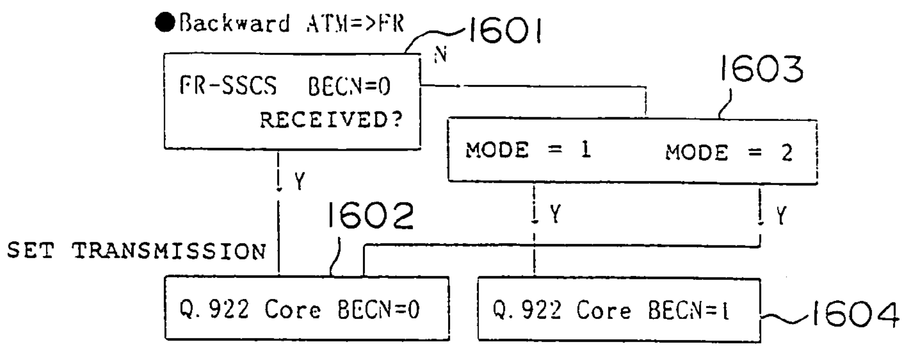
FIG. 16 is a flow chart for describing a mode setting method for a backward direction defined from an ATM network to a frame relay network.

In this flow chart of FIG. 16, a determination is made as it to whether or not a value of BECN of FR-SSCS received by the FRS/ATM converting function unit (IWF) 202 is equal to "0" (step 1601). When this value of BECN of FR-SSCS is equal to "0", "0" is similarly set to the value of BECN of the Q. 922 core frame (step 1602).

To the contrary, when the value of BECN of FR-SSCS is not equal to "0", two modes are selectable (step 1603).

A first mode (step 1604) corresponds to such a mode that a value of a BECN field of FR-SSCS is directly duplicated to the Q. 922 core frame without any conditions.

A second mode (step 1602) corresponds to such a mode that the value of BECN of the Q. 922 core frame is always set to "0". In accordance with this second mode, the congestion information in the backward direction can be neglected. This becomes effective in such a case that the congestion information is not required, depending upon service conditions.

FIG. 22 indicates the contents of the mode operations. FIG. 23 shows the set values of BECN of the Q. 922 core frame in the respective modes.

Mode Setting Operation of Backward Direction: Frame Relay Network—ATM Network

Figure 4:
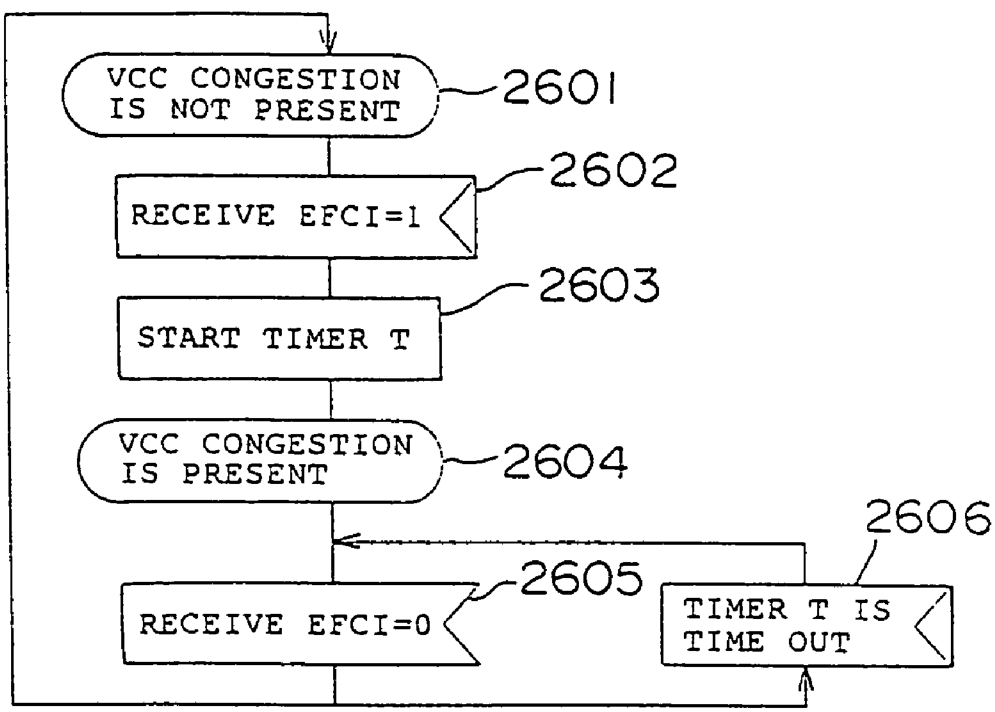
FIG. 4 is a flow chart for describing a VCC state transition in this embodiment.
Figure 17:
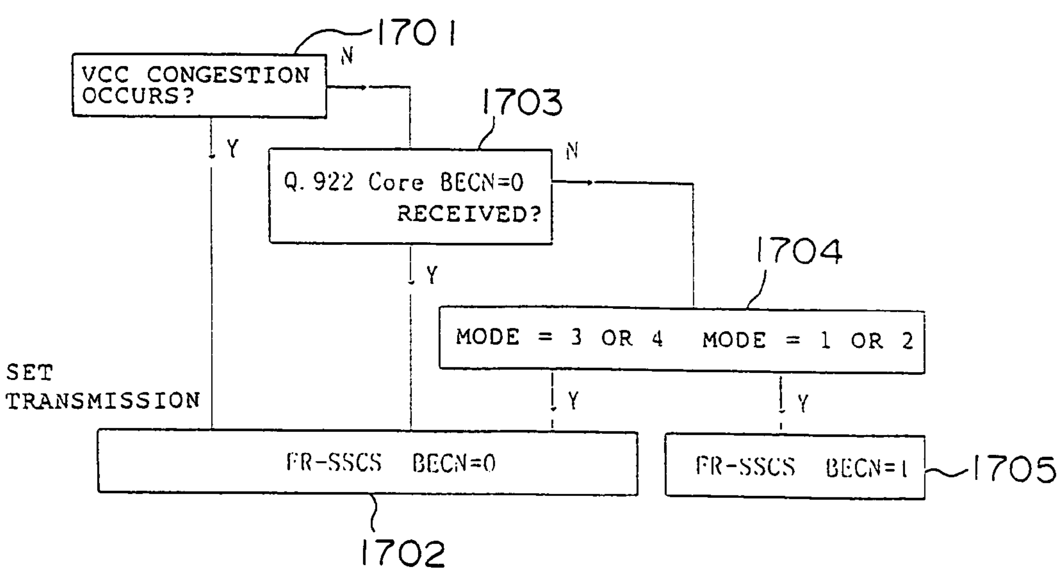
FIG. 17 is a flow chart for describing a mode setting method for a backward direction defined from a frame relay network to an ATM network.

FIG. 17 is a flow chart for showing a control sequence in the backward direction defined from the frame relay network to the ATM network. In this mode setting operation, the state transition of either "congestion occurs" or "no congestion" is judged with providing a protection time period in accordance with the VCC congestion state transition diagram shown in FIG. 4. A state monitoring operation of this VCC is carried out by a VCC state monitoring unit 416 shown in FIG. 1. In FIG. 4, "no VCC congestion" is set as an initial setting condition (step 2601). Then, when EFCI=1 is received (step 2606), the timer T starts its time counting operation (step 2603). While the time counting operation is commenced by this timer T, the present state is moved to "VCC congestion occurs" (step 2604). Then, when EFCI=0 is received by time out (step 2605), or time out is taken place (step 2606), the present state is again moved to "no VCC congestion" state.

Next, in the below-mentioned mode 1, or mode 3, the state transition occurs at timing when EFCI=1 of a final ATM cell. In the below-mentioned mode 2, or mode 4, the state transition occurs at timing when EFCI=1 of any one of ATM cells.

In the case that "VCC congestion occurs" is found based upon the state transition as explained in FIG. 4 (step 1701), the value of BECN of FR-SSCS is set to "0" (step 1702).

On the other hand, when there is no congestion of VCC and furthermore such a Q. 922 core frame is received, the BECN value of which is set to "0", the BECN value of FR-SSCS is set to "0" (step 1702).

In any cases that the BECN value of the received Q. 922 core frame is equal to any value other than "0", modes 1 to 4 can be set.

In the first mode, an EFCI value of an ATM cell in a "last" segment frame is employed in a VCC congestion transition, and furthermore, the congestion state of VCC is set to "congestion occurs". The final segment frame is received along an ATM network to frame relay network direction used in a bi-directional connection. In this case, "1" is set to the BECN value of FR-SSCS.

A second mode corresponds to such a mode in which a BECN value of a Q. 922 core frame transmitted along a frame relay network—ATM network direction is set, or an EFCI value of an ATM cell in any one of segment frames is employed in a VCC congestion transition, and furthermore, the congestion state of VCC is set to "congestion occurs". This any segment frame is received along the ATM network to frame relay network direction used in the bi-directional connection. In this case, "1" is set to the BECN value of FR-SSCS.

In a third mode, a BECN value of a received Q. 922 core frame is negligible. Then, in this third mode, an EFCI value of an ATM cell in a "final" segment frame is employed in a VCC congestion transition, and furthermore, the congestion state of VCC is set to "congestion occurs". The final segment frame is received along the ATM network to frame relay network direction used in the bi-directional connection. In this case, "1" is set to the BECN value of FR-SSCS.

Similarly, in a fourth mode, a BECN value of a received Q. 922 core frame is negligible. Then, this fourth mode corresponds to such a mode in which an EFCI value of an ATM cell in any one of segment frames is employed in a VCC congestion transition, and furthermore, the congestion state of VCC is set to "congestion occurs". This any segment frame is received along the ATM network to frame relay network direction used in the bi-directional connection. In this case, "1" is set to the BECN value of FR-SSCS.

As a consequence, in this case, the mode 3 and the mode 4 are additionally provided, by which there is no mutual compatibility between the congestion information in FR-SSCS and the congestion information in the Q. 922 core frame. As a result, it is possible to select such a flexible transmission system for the congestion information.

FIG. 24 indicates the contents of these first to fourth modes, and FIG. 25 represents the setting values of the BECN of FR-SSCS in the respective modes.

What is claimed is:

1. An apparatus for interfacing a frame relay network and an ATM (Asynchronous Transfer Mode) network, comprising:

congestion information extracting means for extracting congestion information from data of one network of said frame relay network and said ATM network;

mode setting means for setting a mode for deciding congestion information of an output side in accordance with combination of said extracted congestion information and a setting condition, and said mode setting means selects any one of a plurality of modes; and congestion information writing means for writing the congestion information into data of the other network of said frame relay network and said ATM network in accordance with a mode set by said mode setting means.

2. An apparatus for interfacing a frame relay network and an ATM (Asynchronous Transfer Mode) network, comprising:

congestion information extracting means for extracting congestion information from data of one network of said frame relay network and said ATM network;

mode setting means for combining said extracted congestion information with congestion information of an output side in accordance with a setting condition; and congestion information writing means for writing the combined congestion information into data of the other network of said frame relay network and said ATM network in accordance with a mode set by said mode setting means, wherein while setting the congestion information along a forward direction defined from the frame relay network to the ATM network, when said mode setting means receives frame relay data indicating that the congestion information corresponds to "congestion occurs", said mode setting means selects any one of:

a first mode in which "congestion occurs" is set to at least congestion information of an ATM cell corresponding to a segment frame;

a second mode in which "congestion occurs" is set to congestion information of all of ATM cells corresponding to a segment frame; and a third mode in which "congestion occurs"is set only to congestion information of a final ATM cell corresponding to a segment frame.

3. An apparatus for interfacing a frame relay network and an ATM (Asynchronous Transfer Mode) network, comprising:

congestion information extracting means for extracting congestion information from data of one network of said frame relay network and said ATM network;

mode setting means for combining said extracted congestion information with congestion information of an output side in accordance with a setting condition; and congestion information writing means for writing the combined congestion information into data of the other network of said frame relay network and said ATM network in accordance with a mode set by said mode setting means, wherein while setting the congestion information along a forward direction defined from the ATM network to the frame relay network, when said mode setting means receives an ATM cell indicating that the congestion information corresponds to "congestion occurs", said mode setting means selects any one of:

a first mode in which "congestion occurs" is set to at least congestion information of frame relay data when said received ATM cell is a final ATM cell corresponding to a segment frame; and a second mode in which "congestion occurs" is set to congestion information of frame relay data when said received ATM cell is any one of ATM cells corresponding to a segment frame.

4. An apparatus for interfacing a frame relay network and an ATM (Asynchronous Transfer Mode) network, comprising:

congestion information extracting means for extracting congestion information from data of one network of said frame relay network and said ATM network;

mode setting means for combining said extracted congestion information with congestion information of an output side in accordance with a setting condition; and congestion information writing means for writing the combined congestion information into data of the other network of said frame relay network and said ATM network in accordance with a mode set by said mode setting means, wherein while setting the congestion information along a backward direction defined from the ATM network to the frame relay network, said mode setting means selects any one of:

a first mode in which the congestion information transmitted from the backward direction is directly set to congestion information of frame relay data; and a second mode in which congestion information of frame relay data is always set to "no congestion".

5. An apparatus for interfacing a frame relay network and an ATM (Asynchronous Transfer Mode) network, comprising:

congestion information extracting means for extracting congestion information from data of one network of said frame relay network and said ATM network;

mode setting means for combining said extracted congestion information with congestion information of an output side in accordance with a setting condition; and congestion information writing means for writing the combined congestion information into data of the other network of said frame relay network and said ATM network in accordance with a mode set by said mode setting means, wherein while setting the congestion information along a backward direction defined from the frame relay network to the ATM network, said mode setting means includes:

congestion transition means for transferring a congestion state in response to a congestion information value of an ATM cell received along the backward direction; and said mode setting means selects any one of plural modes prepared by combining the state of said congestion transition means with congestion information of frame relay data.

6. An apparatus as claimed in claim 5 wherein:

said congestion transition means includes a timer, and forcibly updates a congestion state when new congestion information is not reached for a predetermined time period.

* * * * *